March 20, 1962 I. AHTIAINEN 3,025,641
BRICK CONSTRUCTION
Filed Sept. 15, 1953

INVENTOR
Iisakki Ahtiainen 3,025,641
BRICK CONSTRUCTION
Iisakki Ahtiainen, Niskapietila, Rautjarvi, Finland, assignor to IA Light-Weight Brick Construction, Inc., Townsend, Mass., a corporation of Massachusetts
Filed Sept. 15, 1953, Ser. No. 380,298
Claims priority, application Finland Sept. 17, 1952
1 Claim. (Cl. 50—354)

The present invention relates to construction materials. More particularly, the present invention relates to the method of making bricks and the use of the bricks in building wall structures.

It is an object of the present invention to provide an improved brick construction.

It is another object of the present invention to provide a method of making bricks wherein the bricks so produced provide a more attractive appearance in the resulting wall structure formed by the bricks and which require a minimum of cement material in forming the wall structure.

Still another object of the present invention is to provide a brick construction by means of which relatively thin but adequately strong wall structures may be constructed and which affords a more economical wall construction of improved insulating qualities.

Other objects and advantages will become apparent from the following description and the appended claims.

In the present processes for making bricks, the bricks are made by casting a clay compound or other material into a mold for forming the brick, after which the bricks are burned. After burning, bricks which are so made are more or less of different sizes and shapes. For that reason, the cement material which is placed between the bricks during the construction of walls or other structures is used not only for the purposes of binding the bricks together, but also to compensate for the differences in size and shape between the individual bricks, by filling up the spaces remaining between the bricks resulting from the irregularly shaped and uneven surfaces of adjoining bricks. Therefore, the cement joint between the bricks must be made relatively thick, and, consequently, the cement constitutes a substantial part of the volume of the wall in currently used wall structures, and may in certain supporting structures amount to as much as 20–25% of the wall structure.

The generally used cement is mortar, which is a poor heat insulator. The thermoconductivity of mortar is usually higher than that of the ordinary brick which it binds, and is especially high with respect to the thermoconductivity of so-called light or floating brick. As commonly understood, a light brick is a brick made of a mixture of mineral compounds and sawdust of wood, cork or similar material. In view of the fact that the physical properties of mortar are inferior to those of bricks, the wall structure which utilizes mortar as a binding material must be made thicker and heavier with respect to considerations of heat economy and strength of the structure, and the structure is therefore more expensive than the favorable physical properties of the bricks themselves would appear to indicate.

The invention, therefore, is designed to avoid the use of common mortars in building wall structures, and to consequently provide a method of building which expedites the process of construction and reduces the labor costs thereof.

With the above objects in view the present invention concerns a structural member consisting of a brick having its outer surfaces formed in even regular shapes, the brick having a predetermined size, so that the brick may be assembled with similarly formed bricks of the same size with the bricks closely fitting together leaving a minimum space between the bricks.

The invention also consists in a structural arrangement which comprises a plurality of bricks assembled in contact with each other, the bricks being of a predetermined size and having at least their contact surfaces formed in even regular shapes so as to fit together with a minimum space therebetween, and a thin film of cement material between the bricks at their contact surfaces for joining the bricks together.

The invention also involves a method of making a brick which comprises the steps of forming a roughly shaped brick having uneven surfaces, and shaping the surfaces into even regular shapes while forming the brick into a predetermined size, whereby a plurality of bricks so formed may be assembled in contact with each other with a minimum of space left between the bricks.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 1:
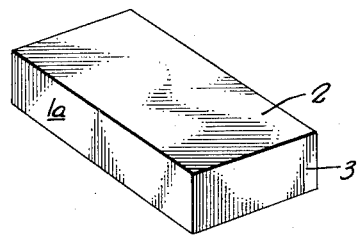
FIG. 1 is a perspective view of a brick formed in accordance with the present invention.
Figure 5:
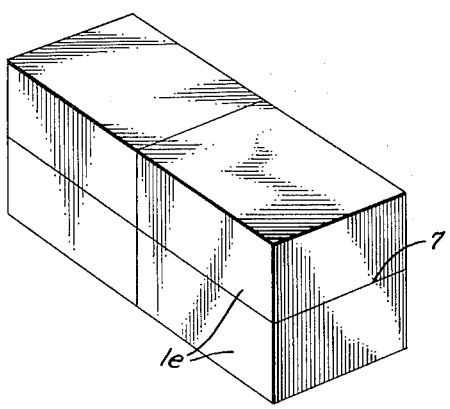
FIG. 5 is a perspective view of a portion of a wall structure by an assembly of bricks constructed in accordance with the present invention.

Referring now to the drawings, FIG. 1 shows a brick 1a constituting a simple form of brick which is constructed in accordance with the invention. The brick may be made in the known way and burned by the usual methods, and after the brick has been formed by such methods, all of its surfaces are machined so that they have an even shape and so that the brick is given a definite size, with the result that when a plurality of the bricks are assembled together the adjoining sides thereof fit as evenly and as cosely together as possible, as is shown in FIG. 5. Instead of machining all of the surfaces of the brick, only the contact surfaces, as for example the surfaces shown at 2 and 3 in FIG. 1 may be machined in the manner mentioned.

The machining of the surfaces may be conveniently done by mechanical means, as for example by grinding wheels or the like so as to achieve the required working speed and accuracy. By using suitable methods, the grinding of the surfaces can be carried out with a tolerance of 0.1 mm., for example. The bricks manufactured in this manner can be joined together to form a very homogeneous structure because the bricks are joined together with an almost imperceptible seam, while the outer visible surfaces of the structure may be formed to provide an extremely even, smooth and substantially continuous surface.

As mentioned above the cement compound used for joining the bricks constructed according to the present invention is not common mortar which is generally used and which is a good heat conductor and relatively heavy. Instead, the binding compound is a suitable cement which is capable of binding minerals and satisfactorily resists prevailing climatic conditions. An example of a cement compound of this type is water glass. Other suitable cements for this purpose are acid resisting water glass glues containing fine ground silica powder and acid salts, and further bituminous solvents or emulsions.

Also, appropriate cementing compounds for use in accordance with the invention are found among plastic substances and compounds thereof. Examples of such compounds are silicon resins, urea formaldehyde resins and phenol formaldehyde resins.

It is to be noted that by the very nature of the present invention, the relative amount of cement compounds used for joining the bricks is extremely limited so that the adjacent brick surfaces are at least partially in contact and the cement compound lies between the adjacent contact surfaces in the form only of a thin film as indicated at 7 in FIG. 5 which is forced into the surface pores of the bricks 1a and thereby effectively constitutes a firmly binding cement. It is evident that in the exceptional case where straightening of the structure makes it necessary, a slightly greater amount of the cement compound must be used between the bricks. For this purpose, a filler may be used in the cement compound, and such a filler may be composed of the powder obtained by machining the surfaces of the bricks. Other suitable filler ingredients may of course be used for this purpose.

In addition to making the bricks of the form shown in FIG. 1 the bricks made according to the invention may be provided with suitable formations for receiving wires and pipes in the final structure, or the bricks can be provided with projections for convenient handling of the bricks. These formations can also be used for guiding the bricks to their correct position while the bricks are being laid.

Figure 2:
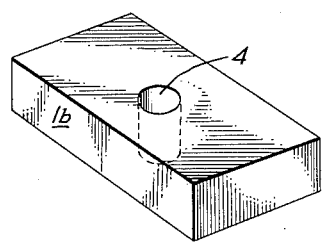
FIG. 2 is a view of another embodiment of a brick formed in accordance with the present invention.

FIG. 2 illustrates a brick construction 1b in which a hole 4 is provided for the purpose of receiving the wire or a pipe as above described.

Figure 3:
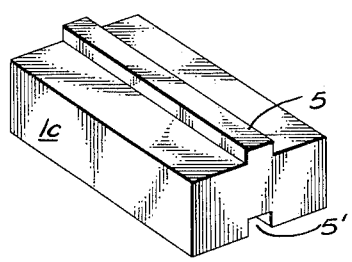
FIG. 3 is a view of still another embodiment of the present invention.

FIG. 3 shows a brick structure 1c having a rib and groove formation 5—5' by means of which the bricks may interfit with each other so as to accurately position the bricks while they are being laid. The particular form of the ribs and grooves may, of course, vary as desired it being only necessary that complementary formations be provided in all the bricks so that the bricks will closely fit each other when assembled.

Figure 4:
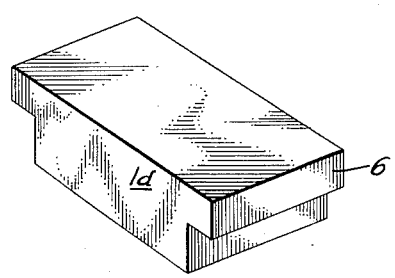
FIG. 4 is a view of still a further embodiment of the present invention.

FIG. 4 shows an embodiment of a brick in accordance with the invention wherein the brick 1d is provided with a projection 6 by means of which the bricks may be conveniently handled during the construction operation or for any other handling of the bricks.

A wall structure which is constructed in accordance with the invention can be formed to have a practically homogeneous appearance, and it has substantially the same physical characteristics as each component brick. If so-called light brick constructed in accordance with the invention is used, extremely favorable heat economy can be achieved with a relatively thin but still sufficiently strong wall structure, which thus far has not been possible where bricks and mortar have been used in the known manner.

Due to the fact that the face of the structure is smooth and even when constructed in accordance with the invention, it is usually not necessary to cover the inside or the outside of the structure with plaster or other decorative coating materials, unless it is especially desired or required. It is of course of advantage to apply a protective coating on the outside of the wall structure for the purposes of preventing penetration of humidity through the structure.

Since the structure formed in accordance with the invention can be made relatively light while being strong, even entire standard wall or other structural components can be prefabricated and then brought to the building site to be assembled in their proper position, as, for example, in the case of building prefabricated frame type buildings.

It will be understood that each of the elements described above, or two or more together, may also find a useful application in other types of constructional arrangements differing from the types described above.

While the invention has been illustrated and described as embodied in bricks for building wall structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A brick structure of substantially uniform composition, comprising, in combination, a plurality of bricks assembled in contact with each other, said bricks being of a predetermined size and having at least their contact surfaces ground in even regular shapes so as to fit together with a minimum space therebetween; and a thin film of water glass containing a filler material composed of ground-off brick material, said ground-off brick material being of the same composition as the material of said plurality of bricks, between said bricks at their contact surfaces for joining said bricks together, whereby said structure consists with exception of the water glass therein exclusively of the same brick material so as to form a substantially integral structure of great strength, substantially even color and throughout uniform characteristics.

References Cited in the file of this patent

UNITED STATES PATENTS

| | | |
|---|---|---|
| 64,994 | McLaughlin | May 21, 1867 |
| 338,490 | Cowan | Mar. 23, 1886 |
| 1,252,785 | Cox | Jan. 8, 1918 |
| 1,374,356 | Clouser et al. | Apr. 12, 1921 |
| 1,377,739 | Thickens | May 10, 1921 |
| 1,817,022 | Slidell et al. | Aug. 4, 1931 |
| 1,897,659 | Brassert et al. | Feb. 14, 1933 |
| 2,558,630 | Stewart | June 26, 1951 |